United States Patent [19]

Nayak et al.

[11] Patent Number: 4,493,557
[45] Date of Patent: Jan. 15, 1985

[54] MIXING APPARATUS

[75] Inventors: Ashok L. Nayak, Corning, N.Y.; Paul F. Spremulli, Chapel Hill, N.C.

[73] Assignee: Corning Glass Works, Corning, N.Y.

[21] Appl. No.: 438,355

[22] Filed: Nov. 1, 1982

[51] Int. Cl.³ ............................................. B01F 7/00
[52] U.S. Cl. ..................... 366/300; 65/178; 366/297; 366/301; 366/330
[58] Field of Search .............................. 65/178–180; 366/66, 97–99, 292, 293, 297–301, 303, 325, 330, 348, 603

[56] References Cited

U.S. PATENT DOCUMENTS

| | | | |
|---|---|---|---|
| 389,331 | 9/1888 | Smith | 366/301 |
| 714,391 | 11/1902 | McKenney | 366/297 X |
| 2,750,161 | 6/1956 | Simmons | 65/178 X |
| 3,057,175 | 10/1962 | Rough et al. | 65/178 |
| 3,236,618 | 2/1966 | Allman | 65/178 |
| 4,172,712 | 10/1979 | Heller | 366/301 X |
| 4,281,934 | 8/1981 | Krause et al. | 366/300 X |

Primary Examiner—Timothy F. Simone
Attorney, Agent, or Firm—B. R. Turner

[57] ABSTRACT

An apparatus for mixing or homogenizing viscous material is disclosed. Stirrers, comprising multiple vane mixing blades are mounted on a pair of parallel shafts in corresponding spaced apart parallel tiers. Each vane has a working surface inclined relative to the shaft and offset relative to the vanes of an immediately adjacent blade. One shaft is advanced relative to the other so that the vanes intermesh. The inclination of the vanes in one blade is mirrored in sense to the other blade on the adjacent shaft, and the shafts are rotated in opposite sense so that the stirrers in each tier pump the material in the same relative direction when the shafts are so rotated.

16 Claims, 9 Drawing Figures

Fig. 5

MIXING APPARATUS

BACKGROUND OF THE INVENTION

The invention relates to methods and apparatus for homogenizing viscous material. More particularly, the invention relates to apparatus for mixing, stirring and blending molten glass as it moves through a flow path such as a forehearth channel or the like.

Molten glass is mixed or blended for a variety of reasons. For example, it is known that molten glass proceeding from a furnace or forehearth usually contains visible defects in the form of inhomogenities or discontinuities. These defects, known by a variety of names (stones, cords, seeds, striae, mares, and tails), result from impurities in the glass, incomplete fining or incomplete blending of color additives. If not sufficiently removed or dissipated, defects are carried over into the formed glass article, rendering the same unmarketable.

Glass is also stirred to remove thermal irregularities. When the temperature of the glass is uniform, it has predictable forming characteristics and better quality ware is produced.

Previous work with stirrers has resulted in satisfactory blending of glass. However, many stirrers may be required to produce good results. Further, there is usually some history associated with molten glass passing through stirrers. In other words, an element of glass entering the stirrer at a particular place will follow a statistically predictable path. Thus, unless many stirrers are used, the history of the element may not be completely wiped out.

History may be removed by slowing the flow rate of the glass, thereby allowing the glass to be subjected to the blending action of the stirrers for a longer period of time. When the flow rate is reduced, productivity decreases and energy consumption increases. Even with reduced flow rates and more stirrers, mixing is sometimes insufficient because some glass may find a flow path which avoids the stirrers. Thus, mixing does not occur and defects persist. The stirrer speed may be increased to improve mixing at high flow rates. However, there is a risk of seed and blister formation on the glass surface.

In the present invention, a pair of stirrers is provided for mixing glass in a channel or forehearth. All the glass passing through the stirrers receives sufficient mixing to produce good quality product. Mixing occurs in such a manner that the history of any individual element of glass is effectively wiped out. This means that a defect upstream of the stirrers will not reappear downstream thereof at a predictable location. If the position of the upstream defect is changed, there will be no observable change downstream of the stirrers. Thorough mixing occurs because the glass entering the stirring system sees a front or barrier. Care has been taken to effectively eliminate short circuit paths through and around the stirrers. This allows the glass to receive the full effects of the stirrers. Also, corresponding elements of glass, relative to a line of symmetry, receive the same treatment. Symmetry eliminates imbalances which cause short circuits.

SUMMARY OF THE INVENTION

The present invention provides an apparatus for mixing or homogenizing viscous material. The apparatus includes a pair of stirrers each having a shaft mounted for rotation about its respective axis. A number of blades are mounted on each shaft in corresponding spaced apart tiers lying parallel to each other and perpendicular to the shaft axis. Each blade is formed of multiple vanes extending radially from the shaft and lying in the corresponding tier. Each vane has a working surface inclined relative to the shaft axis. The working surface engages the material for pumping the same as the shaft is rotated. The vanes of each blade on a shaft are angularly offset relative to the vanes of a blade in an immediately adjacent tier. The stirrers are located side-by-side with their shaft axes in parallel relation. The spacing of the blades on each shaft is the same as that of the other shaft so that the blades in adjacent tiers are coplanar. One shaft is advanced relative to the other by a predetermined angle so that the vanes in adjacent blades and the same tier intermesh. The structure of the vanes in one blade is mirrored in sense to the other blade on an adjacent shaft, and the shafts are rotated in opposite sense so that the stirrers in each tier pump the material in the same relative direction when the shafts are so rotated.

DESCRIPTION OF THE DRAWINGS

FIG. 5 is a truth table with symbols showing pumping action of the vanes and flow direction of the glass relative to a centerline of the mixing apparatus.

In all the above Figs., the flow direction of viscous material is shown where possible by conventional arrows. In some of the drawings flow direction of the material in a direction out of the page is symbolized by a dot in a circle and flow direction into the page is symbolized by an X in a circle.

DESCRIPTION OF THE PREFERRED EMBODIMENT

Figure 1:
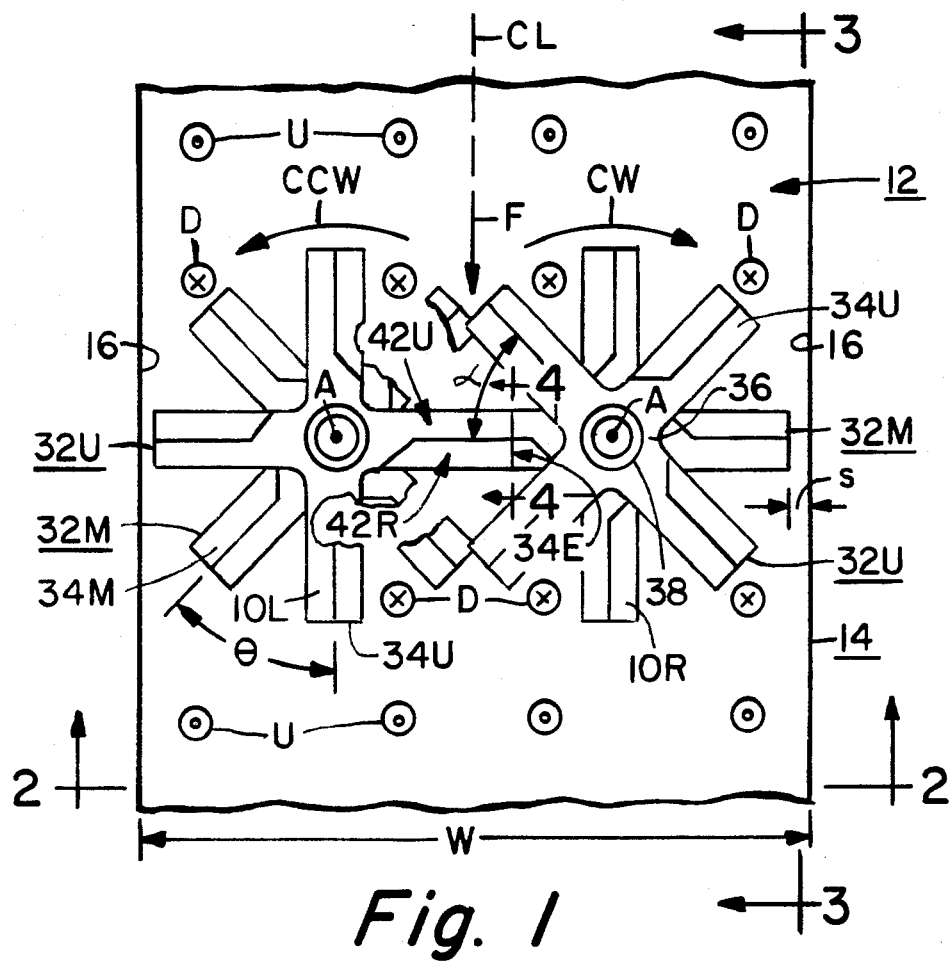
FIG. 1 is a fragmented schematic top plan view of the mixing device of the present invention located in a channel forehearth.
Figure 2:
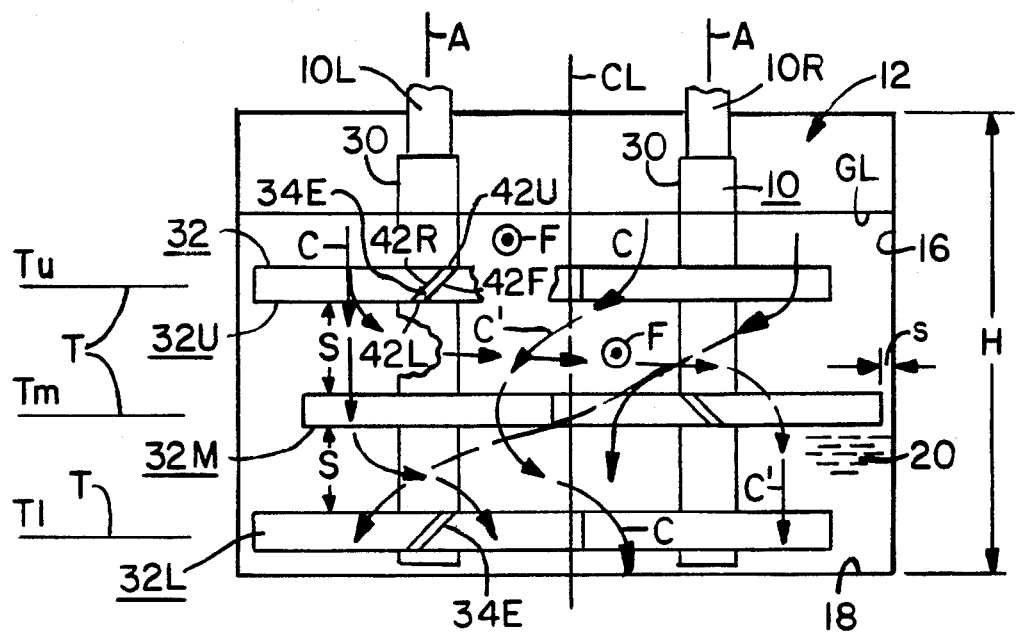
FIG. 2 is a fragmented front elevation of the mixing device of the present invention taken along line 2—2 of FIG. 1.
Figure 3:
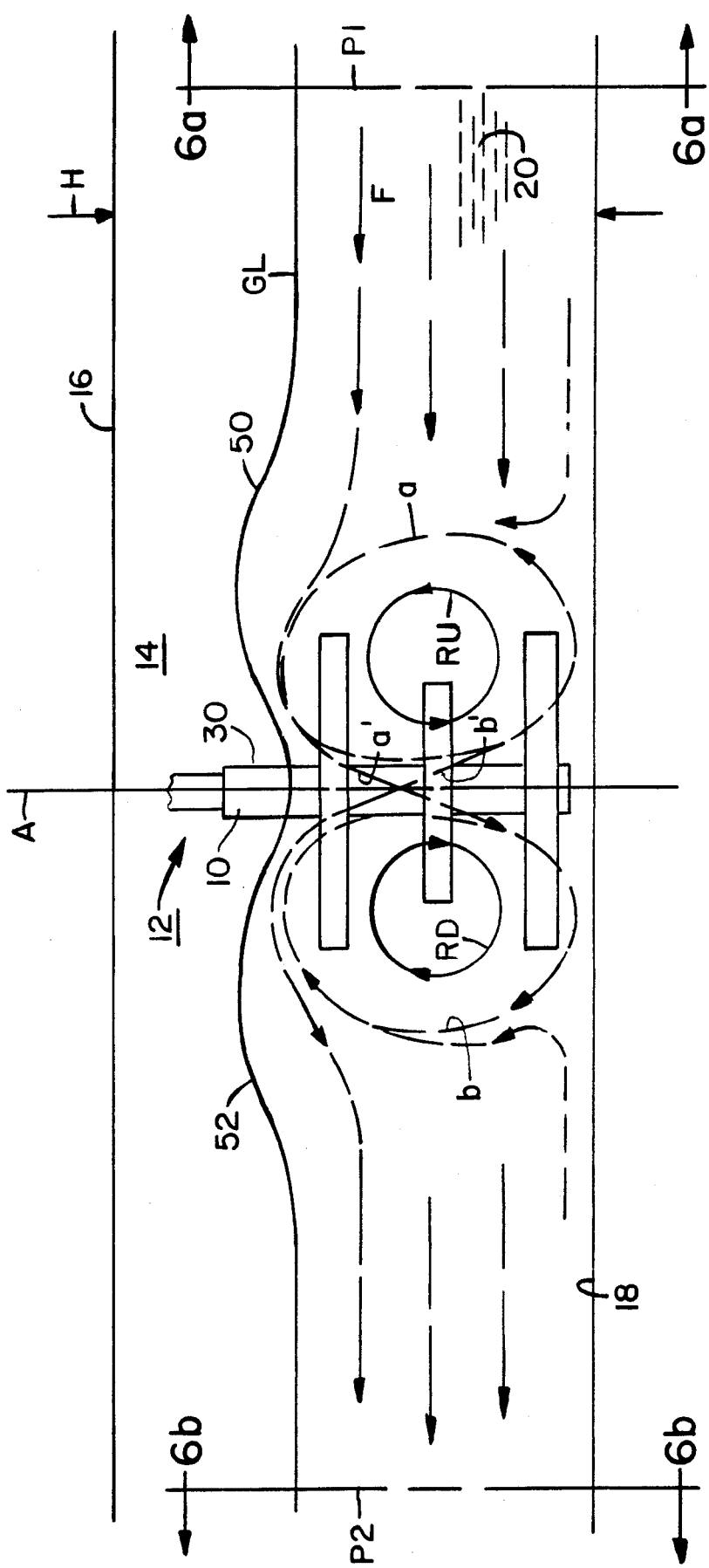
FIG. 3 is a fragmented schematic side view of the mixing device of the present invention taken along line 3—3 of FIG. 1.

In FIGS. 1-3, a channel stirrer or mixing device 12 is illustrated schematically. The mixing device 12 is formed of a pair of mixing elements or stirrers 10 located transversely of a forehearth or channel 14. The channel 14 includes sidewalls 16 and a bottom wall 18. A top wall or cover is not shown.

In the channel 14, sidewalls 16 are more or less parallel and at right angles to the horizontal bottom wall 18. Other arrangements are possible, but are not detailed herein. The sidewalls 16 are spaced apart by a distance W and extend from the bottom wall 18 to a height H.

The channel 14 contains a body or mass of molten glass 20 moving in a flow direction F. In FIG. 1, arrow F, symbolizing flow direction, points down from upstream of the stirrers 10 to downstream thereof. In FIG. 2, the flow direction F is out of the page, and in FIGS. 3 and 4 the flow direction F is from right to left.

In a preferred embodiment, the stirrers 10 are identical to each other in every way except one is structurally the mirror image of the other. Thus, except as hereinafter stated, whatever is said about one will apply to the other but in opposite sense. When necessary, the position of one stirrer 10 will be referred to by left (L) and right (R) designation with respect to centerline CL of the channel 14. Also, when necessary, a portion of a stirrer 10 is identified separately in accordance with its relative vertical position by respective upper (U), middle (M) and lower (L) designations.

Each stirrer 10 comprises a shaft 30 mounted for rotation about axis A by means not shown. The axes A are parallel to each other. A plurality of blades 32 are secured to each shaft 30. In a preferred embodiment, the blades 32 are equally spaced apart in tiers T. For example, the respective upper, middle and lower blades 32U, 32M and 32L lie in respective upper, middle and lower tiers TU, TM, and TL. The tiers T are parallel to each other and evenly spaced by a distance S from each other.

Each blade 32 is formed with a plurality of at least two vanes 34 extending radially outwardly from a hub 36. Hub 36 has a hole 38 formed therein. Each blade 32 is sleeved onto shaft 30 and positioned as shown. Means, such as a key or spline and lock nut (not shown), may be used to secure the blades 32 onto the shaft 30 in a selected position relative to other such blades on the shaft 30. For example, the spacing of the blades may be adjusted along the axis A of the shaft 30. Also, in a preferred embodiment, the upper blade 32U in the upper tier TU is positioned so that its vanes 34 vertically align with the vanes 34 of the lower blade 32L. Blade 32M, in middle tier TM, intermediate blades 32U and 32L, is positioned so that its vanes 34 are circumferentially offset from the vanes of an immediately adjacent tier. The offset is measured by offset angle $\theta$.

$$\theta = 360/2n$$

Where n is the number of vanes
In the example set forth herein, for a four-vaned blade, $\theta = 45°$.

In FIG. 1, the right hand stirrer 10R is constructed in the same manner and spacing as the left hand stirrer 10L. The two stirrers 10L and 10R are located side-by-side with maximum overlap of vanes 34 as shown. Respective shafts 30L and 30R are parallel, and vanes 34 of each blade 32, in a corresponding tier, intermesh by a selected advance angle $\alpha$ in the manner of gear teeth. Left stirrer 10L is advanced $\alpha°$ relative to right stirrer 10R. The advance angle $\alpha$ is a function of the number n of vanes 34 in each blade 32.

$$\alpha = 360/2n$$

In a four-vaned arrangement $\alpha = 45°$. In a symmetrical system, the advance angle $\alpha$ equals the offset angle $\theta$.

Advancing one blade 32 relative to another creates a number of beneficial effects. The respective left and right channel stirrers 10L and 10R may be as closely coupled as shown in FIG. 1. Also, when one vane 34 crosses centerline C1 of the channel in one tier T, another vane 34 approaches the same in another tier T. Thus, there is less likelihood of a short circuit path appearing through the stirrer 10. The advance angle $\alpha$ is an exception to the mirror image between blades 32 as hereinbefore mentioned. Structurally blade 32L is the mirror of right blade 32R.

Figure 4:
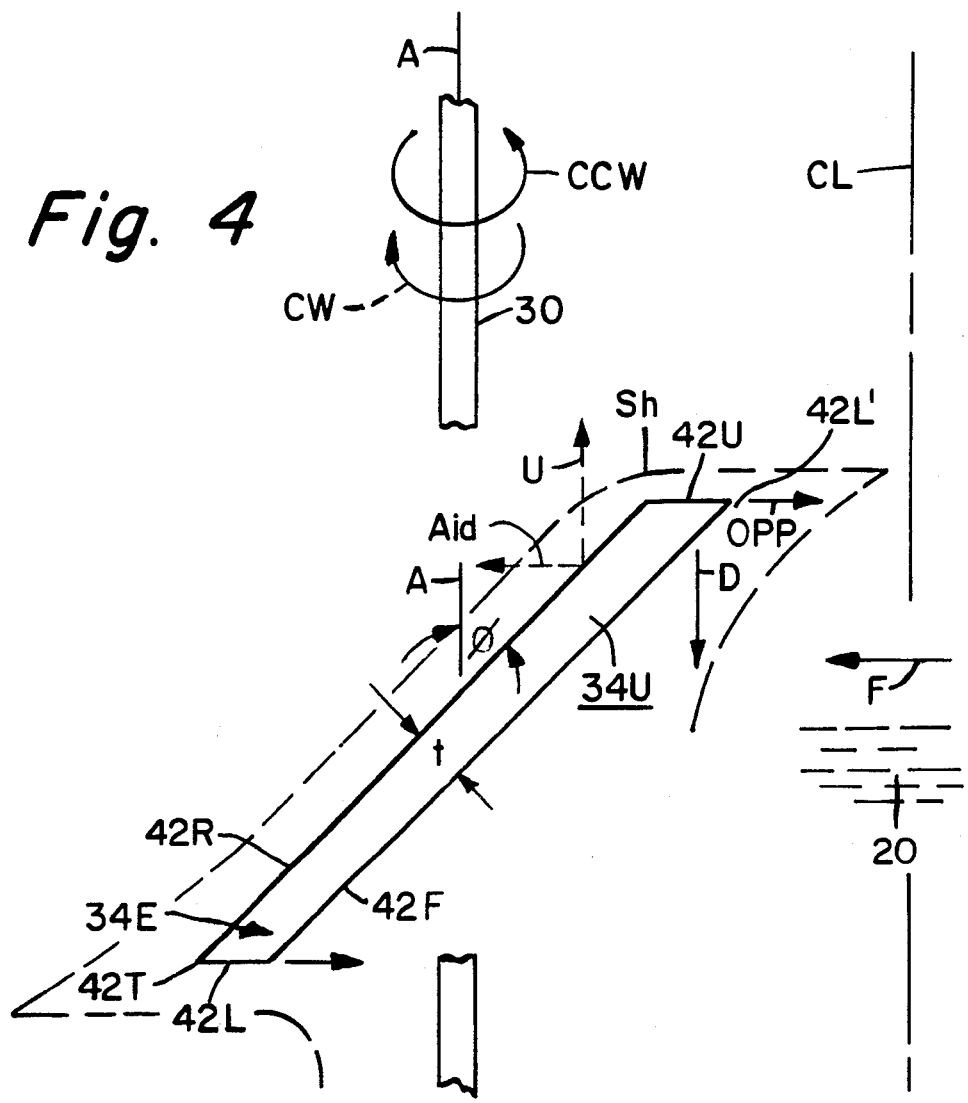
FIG. 4 is an enlarged view of the end of a vane taken along line 4—4 of FIG. 1.

Referring now to FIG. 4, there is shown an end face 34E of vane 34 on upper blade 32U of left stirrer 10L taken along line 4—4 of FIG. 1. The drawing shows only the outline of the end face 34E and a portion of the shaft 30 driving blade 32U. Other portions of the blade 34U are removed for clarity. The vane 34 is a bar of thickness t having the cross-sectional shape of a parallelogram. Respective upper and lower surfaces 42U and 42L run perpendicular to shaft axis A, or parallel to the bottom wall 18 of the channel. Respective front and rear working surfaces 42F and 42R are disposed at an angle $\phi$ relative to the shaft axis A. Maximum pumping efficiency is achieved when $\phi$ is 45°. The vanes 34 pump and shear the glass as the shaft 30 is rotated.

The vanes 34 have been shown as straignt bars having the shape of a parallelogram (see FIG. 4). However, many shapes are possible including curves, cupped, or angled bars. The shape shown herein is the most preferred because it is easiest to manufacture.

In FIG. 4 the flow direction of the glass 20 is from right to left. Shaft 30 is rotated counterclockwise (see arrow CCW). End face 34E of the vane 34 is parallel with the centerline CL and is moving in a direction in opposition to the flow direction F (see arrow Opp.). The front working surface 42F of vane 34 is oriented downwardly and is also moving in opposition Opp. to the flow F. Thus, front working surface 42F tends to pump the glass downwardly in the direction of the arrow D.

In FIG. 4 the front working surface 42F of vane 34 pumps down and the rear working surface 42R thereof draws glass 20 diagonally thereacross. Thus, differential motion or shearing of the glass 20 occurs near respective leading and trailing edges 42L' and 42T of the vane 34 (see dotted line labeled Sh). Shearing causes elements of the glass 20 to separate at leading edge 42L'. Relative motion causes different elements of the glass 20 to rejoin near trailing edge 42T, thus mixing is enhanced.

If the direction of rotation of the shaft 30 is reversed (see dotted clockwise arrow CW), rear working surface 42R will move with or assist the flow of the glass 20 in the direction of the dotted arrow marked Aid. Thus, the rear working surface 42R will be operative to pump the glass 20 up in the direction of the dotted arrow U. The vanes 34 may move in opposition to or aid the flow direction F only during a portion of each rotation. In the present invention, this convention is established when the end face 34E of vane 34 is moving near the centerline CL as noted above.

In a preferred embodiment, all of the vanes 34 of a particular blade 32 are oriented in the same direction. Thus, all of the vanes 34 in a blade 32 pump up U or down D in accordance with the direction of the rotation of shaft 30. It should also be understood, however, that the blades 32 on a particular shaft 30 may be mixed so that some blades pump down while others pump up.

The vanes 34 of the right stirrer 10R on a tier T are oriented as a mirror image of the left stirrer 10L in the same tier T. Thus, the vanes 34 of the right stirrer 10R will pump in the same direction as the left stirrer when rotated in the opposite sense of each other.

Reversal in the direction of pumping may occur in a number of ways. The direction of rotation of the shaft 30 carrying the blade 32 may be reversed, thereby reversing the pump direction. The blade 32 may be inverted on the shaft 30 causing a reversal of the pumping direction. Finally, the blade 32 may be switched between the respective right There exists four possible pump and flow direction arrangements in accordance with the present invention. The possibilities or cases are set forth in the truth table of FIG. 5. It will be assumed that the stirrers 10L and 10R will be rotated in opposite sense to each other.

Figure 5:
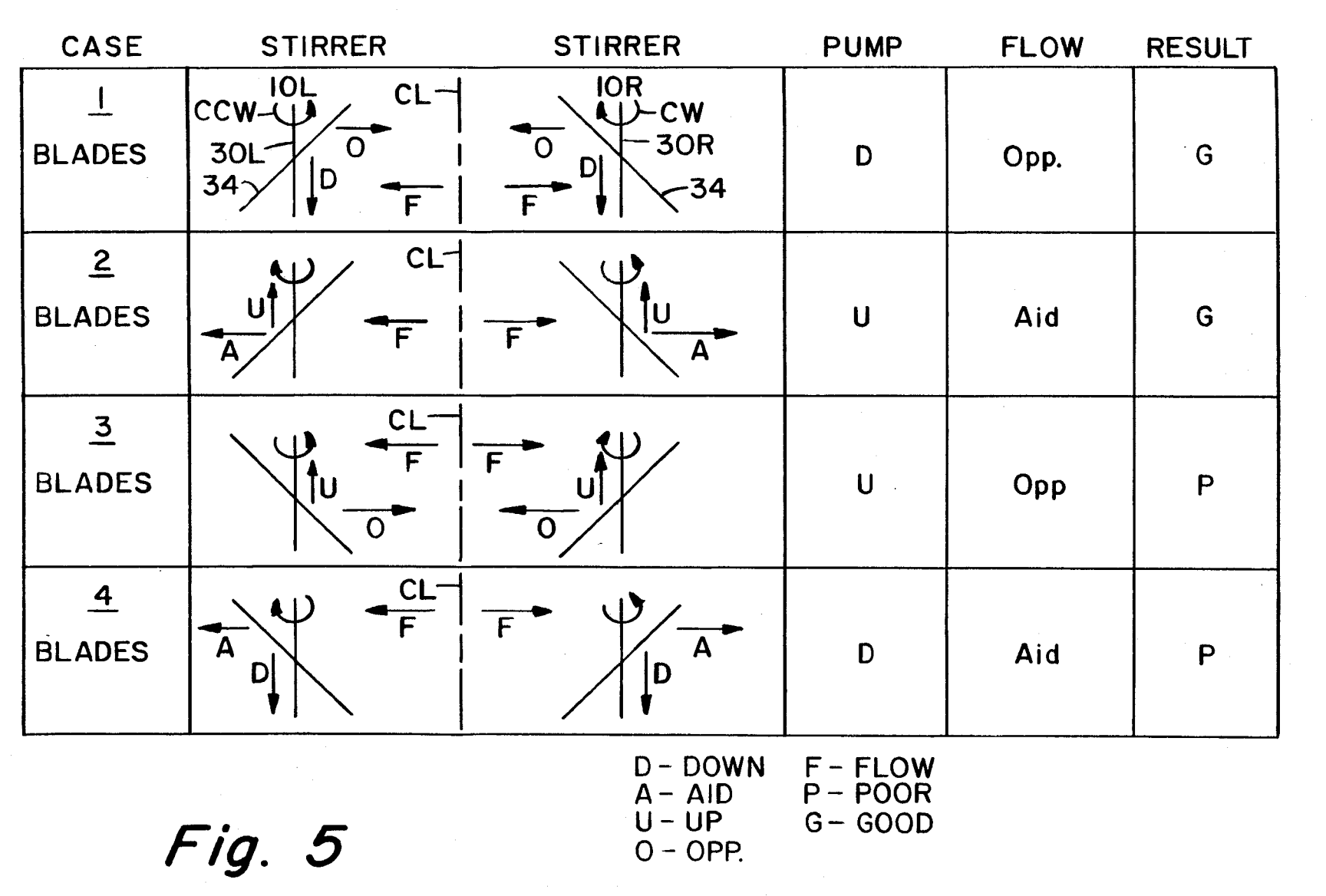

In the table of FIG. 5, the flow F is defined relative to the centerline CL, and the direction of rotation of the respective left and right shafts 30L and 30R is given by the notation CW clockwise or CCW counterclockwise noted above. Pump and flow directions are set forth adjacent the particular case in question. Only an end 34E of the vane 34 is illustrated as in FIG. 4.

In Case 1, shaft 30L of stirrer 10L is rotated counterclockwise in opposition Opp to the flow F. Pumping occurs in the downward direction D in opposition Opp. to the flow. In the same case 1, the shaft 30R of right hand stirrer 10R is rotated clockwise, in the opposite sense to its counterpart 10L. The vane 34 is tilted so that its working surface pumps down D and in opposition Opp. to the flow F. The arrangement of case 1 produces good G results and is a preferred arrangement for a channel stirrer of the present invention. In case 2, the shaft directions have been reversed and thus pumping is up U and assists Aid the flow F. The results from this arrangement are also good.

In cases 3 and 4 the blades 34 have been reversed (either inverted on the same shaft or switched between shafts). In case 3, for example, the counterclockwise rotation of shaft 30L causes up U pumping in opposition Opp. to the flow F. A comparison with case 1 shows that a reversal of the blade will cause a reversal in the pump direction. In case 4 the shaft direction is reversed thereby causing the pumping action to be down D and assisting Aid the flow. It should be understood that combinations of the above four cases are possible for mixed pumping on one shaft. It has been found, however, that the preferred arrangement is for all the pumping to proceed in the same direction either upwardly or downwardly. In some cases, where an upper surface or glass line GL of the glass 20 is particularly active and susceptible to undulation, blisters may form. Mixed pumping has been found to correct this problem as follows. Case 1 mixing is provided on respective middle and lower tiers TM and TL and Case 3 mixing is provided in the upper tier T3. The upward pumping in the upper tier TU helps to remove surface inhomogeneities and stabilizes the upper surface GL. Additional alternatives and variations are possible. For example, blades having different numbers of vanes may be used on the same shaft. However, the vanes in a particular tier should be the same in number. If the number of vanes is increased the speed of rotation of the shaft 30 may generally be descreased proportionally. It is also possible to mix vanes 34 on the same blade 32. For example, vanes 34 diametrically opposite each other on a vertical blade 32 (see FIG. 1) may be tilted oppositely to the vanes 34 perpendicular thereto, so that up and down pumping occurs on the same blade 34. In FIG. 3 case 1 pumping is illustrated. That is, down D pumping in opposition Opp to the flow F. Note how the pumping action creates respective upstream and downstream surface bulges or dams 50-52. The pumping action creates a pair of opposed respective upstream and downstream pumping rolls RU and RD. Glass flowing into the mixing device 12 encounters a barrier in the form of the upstream roll RU. The glass 20 is thereby drawn up over the upstream dam 50 and into the mixing device 12 (see dotted arrow a). Some of the glass 20 continues through the upstream roll RU and is again drawn through the mixing device along the dotted path a. Some of the glass in the path a splits and is drawn into the downstream roll RD (see dotted arrow a'). Some of the glass 20, downstream of the channel stirrers 12, is drawn into the downstream roll RD along dotted path b. Some of the glass 20, following the path of the dotted arrow b, is pumped across into the upstream roll RU as shown by the dotted arrow b'.

In FIG. 2 side to side pumping is shown by the dotted arrows c—c'. Note how flows of c—c' switch between the stirrers 10. Only a few possibilities are shown, but it should be understood that very active side-to-side pumping occurs, which helps to effectively wipe out history and homogenize the glass 20.

Figure 6A:
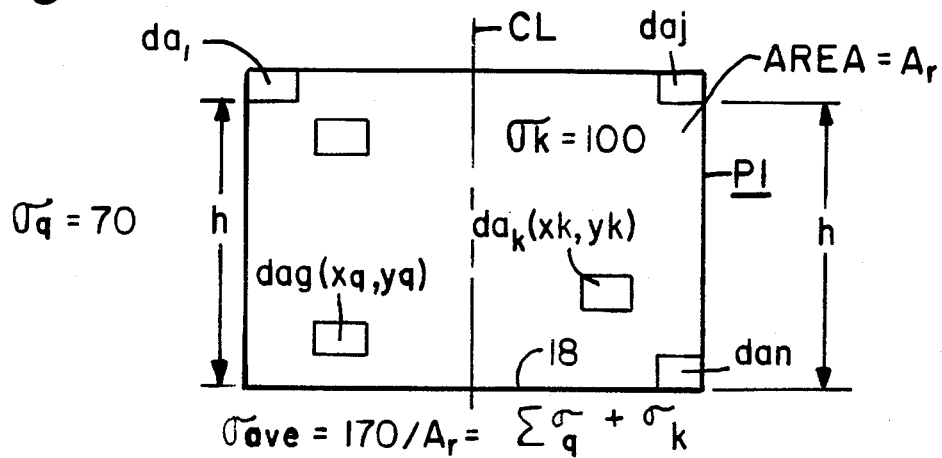
FIG. 6a and 6b are graphic representations of respective vertical planes through the glass upstream and downstream of the mixing apparatus, taken along lines 6a—6a and 6b—6b of FIG. 3.
Figure 6B:
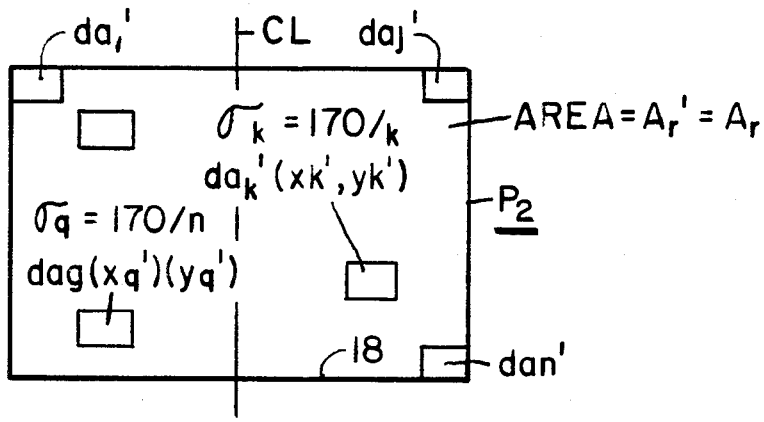

In FIG. 6a, plane P1, taken along line 6a—6a of FIG. 3, is shown. The plane P1 has an area Ar and is divided into an equal number of finite elements $da_1$–$da_n$ of area dAr. In FIG. 6b, a plane P2, taken along line 6b—6b of FIG. 3, is shown. Plane P2 has an area Ar' equal to the area Ar of plane P1. The plane P2 is likewise divided into an equal number of finite elements $da_1'$–$da_n'$ of area dAr'.

In FIG. 6a, an element $da_k$ located at coordinate (xk, yk) has 100 imperfections. The density of such imperfections is given as $\sigma k = 100/dAr$. It may be assumed that some other element $da_q$ located at (xq, yq) has an imperfection density $\sigma q = 70/dAr$. The total number of imperfections for the entire area Ar is equal to the sum $\Sigma$ of the imperfections of n elements. For P1 the total imperfections equal 170. The average density $\sigma$ ave of imperfections is equal to the total number of imperfections divided by the area. ($\sigma$ ave = 170/Ar)

For an ideal mixing device, the imperfections should be either eliminated or at least evenly distributed downstream of the mixing device 12. Referring to FIG. 6a, if one assumes that the total number of imperfections is 170, there being no other imperfections noted, then the average imperfection density $\sigma$ ave is 170/Ar. Ideally, after mixing, the imperfections in plane P2 should not be weighted in favor of any particular element or group of elements. Thus, the imperfection density in each element should equal to or less than the average imperfection density. If this occurs, then it can be said that all history, or variation in the imperfections has been wiped out. In FIG. 6B, the imperfection density of each corresponding elements $da_1'$–$da_n'$ is the same, i.e. 170/Ar'. If all elements have the same imperfection density, homogeneity is achieved. Also, there is no way to deduce history from area Ar'.

In FIGS. 6a and 6b an aspect of symmetry, important to the present invention, is illustrated. Elements $da_1$ and $da_j$ are at equal distance from centerline CL and are at the same height h from bottom wall 18. These elements will, by virtue of the symmetry of the system, receive substantially equal treatment. These elements will also receive at least a minimum amount of mixing, which will be sufficient plane P2. While it is possible for other corresponding symmetrally located elements to be mixed more than the minimum without deleterious effects, no element receives less than the minimum necessary, and corresponding elements receive about the same mixing action.

In the present invention, oil model mixing in accordance with case 1 in FIG. 5 yields results sufficiently close to the ideal so as to be considered statistically equivalent thereto. Near ideal results occur repeatedly after varying the placement location and amount of imperfections in a plane. Similar results also occur if the plane is moved to different upstream positions relative to the mixing device 12.

Figure 7:
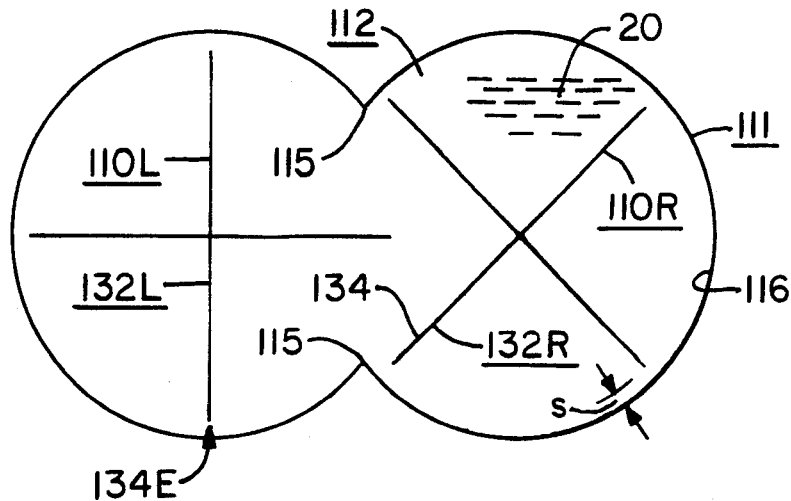
FIG. 7 shows a schematic top plan of stirrers located in a well.

In FIG. 7 a well stirrer 112 is illustrated. Stirring elements or stirrers 110 are located in a well 111. The well 111 has sidewalls 116 which cusp at 115 toward intermeshed portions of the stirrers 110. Paired stirrers as shown herein have a well shaped as a figure "8". Vanes 132 are closely coupled and intermeshed. An end face 134E of each vane 134 is also closely coupled or spaced from the sidewalls 114 by spacing s. The close coupling prevents the possibility of the glass 20 bypassing the well stirrer 112. The left and right stirrers 110L and 110R are similar to the stirrers 10R and 10L of FIGS. 1–4. (Note also that in FIGS. 1 and 2 the end faces 34E of the vanes 34 are also closely coupled or spaced to the sidewall 16 of the channel 14 by an amount s.) The spacing s of each end face 34E and 134E from the respective sidewalls 16 and 116 may vary between 0.5"–1.5". Preferably, the spacing s is uniform and about 0.5".

Figure 8:
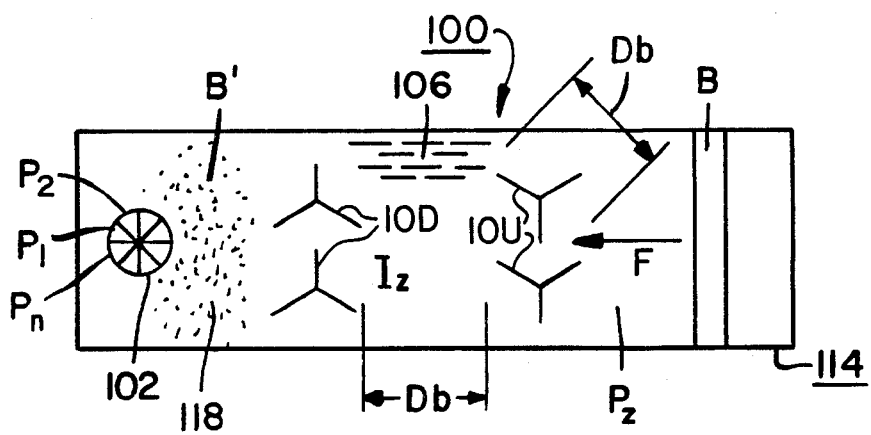
FIG. 8 is a schematic top plan view of a color call located in a channel.

In FIG. 8, a preferred arrangement of a color mixing device or color cell 100 is shown. The color cell 100 includes two sets of respective upstream and downstream channel stirrers 10U and 10D located in channel 114. The upstream stirrer 10U operates as in case I, described above. Premixing occurs upstream of the stirrers 10U in in premix zone Pz. The downstream stirrer 10D operates as Case II. The stirrers 10U and 10D are separated by an interaction zone $I_z$ about one blade diameter Db long. The interaction zone allows the upstream and downstream channel stirrers 10U and 10D to interact and enhance mixing.

In an oil model of the color cell 100, beads B, representing color frit and or seeds, were introduced into a bath of oil 106 in channel 114 upstream of the channel stirrer 10U. The beads B were drawn through the channel stirrers 10U and 10D. Mixed beads B' were thereafter collected downstream of the two channel stirrers 10U and 10D. Collection was accomplished by using a segmented orifice 102 in a bottom wall 118 of the channel 114. The orifice 102 was segmented into pie shaped sections $P_1$-$P_n$ feeding a segmented receptacle (not shown). The mixed beads B' were collected, counted and statistically analyzed to determine the distribution of imperfections as the oil 106 was mixed. The mixed beads B' were color coded to represent different known input positions. It was thus possible to define a model for the history of a particular imperfection. It was found that the tandem arrangement of respective upstream and downstream channel stirrers 10U and 10D statistically wiped out the history of the imperfections. The distribution of beads in the segmented receptacle was random. Thus, the initial position of a bead could not be deduced from the final position. The arrangement of FIG. 8 is a preferred color cell 100.

Another useful arrangement of a color cell, not shown, comprises a set of channel stirrers 12 (see FIG. 1) and a set of well stirrers 112 (see FIG. 7) located downstream thereof. This arrangement is satisfactory but costs more to build.

In the foregoing it can be appreciated that the present invention is useful for dissipating physical and thermal discontinuities in a body of molten glass. Further, the device may be operated as a color cell whereby colorants may be introduced downstream of a furnace outlet and prior to forming.

In the present invention the blades are preferably manufactured from a glass corrosion resistant material such as molybdenum (moly). The shafts 30 may be manufactured from moly or stainless steel. The sidewalls 16 and bottom wall 18 of the channel 14 and the sidewalls 116 the well stirrer 112 can be lined with moly or platinum to prevent corrosion of the same due to the forces of moving glass in the vicinity of the sidewalls 16 and 116.

What is claimed is:

1. An apparatus for mixing viscous material comprising: at least one pair of stirrers, said stirrers located adjacent one another in closely spaced intermeshing relationship and being mounted for rotation about parallel axes in opposing sense to each other, each of said stirres including: a shaft; a plurality of blades mounted on the shaft in parallel axially spaced-apart relation with each other, each blade lying in a corresponding tier perpendicular to the shaft axis, each stirrer having the same number and spacing of blades as said adjacent stirrer, and the blades in each tier of one stirrer being aligned side-by-side in coplanar relation with the blades in corresponding tiers of the adjacent stirrer; each blade including a plurality of evenly spaced radially extending vanes lying within the plane of its blade, each vane having working surface means operatively engaging the viscous material for pumping and stirring the same upon rotation of the stirrer; the vanes of each blade being circumferentially offset from vanes on a blade in an adjacent tier, such that the vanes in adjacent tiers of each stirrer are angularly offset from each other about the axis of the stirrer, and the vanes of one blade being advanced by a predetermined angle relative to the vanes of an adjacent blade in the same tier so that all of said vanes of one blade intermesh with the vanes of such adjacent blade; and each coplanar blade being a structural mirror image of an adjacent blade, such that upon rotation of said stirrers, each working surface means pumps the viscous material in the same relative direction.

2. An apparatus as set forth in claim 1 wherein each blade has the same number of vanes, and the vanes in adjacent axially spaced tiers are circumferentially offset by an angle equal to 360° divided by twice the number of vanes in a blade.

3. An apparatus as set forth in claim 1 wherein the stirrers are located side-by-side in a well having wall portions which cusp toward intermeshed portions of the stirrers, and ends of the vanes are closely coupled with the sidewalls between about 0.5" and 1.0".

4. An apparatus as set forth in claim 1 wherein the viscous material is moving in a selected flow direction, and the blades on each shaft are arranged, such that, the vanes thereof engage the viscous material with working surfaces pumping the material down and in opposition to the flow of the viscous material as defined relative to a centerline between the stirrers.

5. An apparatus as set forth in claim 1 wherein the viscous material is moving in a selected flow direction, and the blades in an uppermost tier are arranged for engaging the viscous material with the working surfaces inclined for pumping upward and aiding the flow of the viscous material near an upper surface of the same.

6. An apparatus as set forth in claim 1 wherein each blade comprises: a hub having an opening therein and being sleevably mounted on the shaft, and the vanes extending from the hub being evenly spaced about an axis of the hub, upper and lower surfaces of the vane being parallel with each other, and the working surfaces being parallel with each other and inclined at the 45° relative to the axis of the hub, such that, each vane has the form of a parallelogram extending from said hub.

7. An apparatus as defined in claim 1 wherein the tiers are equally spaced apart along said axes.

8. An apparatus as set forth in claim 1 wherein the blades in adjacent tiers have the same number of vanes, and one vane is advanced relative to another coplanar vane of the adjacent stirrer by an angle equal to 360° divided by twice the number of vanes in a blade.

9. A method for mixing viscous material comprising the steps of: locating a pair of stirrers in adjacent side-by-side relation; rotating the stirrers about respective axes thereof in opposing sense to each other; forming the stirrers with a plurality of blades in axially spaced-apart tiers with each blade having multiple vanes; providing each stirrer with the same number and axial spacing of blades; arranging the blades of one stirrer in parallel spaced relation with each blade of the other stirrer in a corresponding tier; aligning the blades in each corresponding tier of the stirrers in side-by-side coplanar relation; operatively engaging each vane with the viscous material for pumping and shearing the same upon rotation of the stirrers; circumferentially offsetting each vane on a blade in a tier from vanes in parallel vertically spaced adjacent tiers; angularly offsetting the vanes of one blade with vanes of the adjacent stirrer in the corresponding coplanar tier a predetermined advance angle and intermeshing the vanes within each tier; forming each blade in the same tier as a structural mirror image of an adjacent blade in the tier, and thereby pumping the viscous material in the same relative direction upon opposing rotation of the stirrers.

10. A method as set forth in claim 9 further comprising the steps of: forming each blade with the same number of vanes; and circumferentially offsetting the vanes in adjacnet vertically spaced tiers by an angle equal to 360° divided by twice the number of vanes in a blade.

11. A method as set forth in claim 9 further comprising the steps of: forming the blades in adjacent tiers with the same number of vanes; and advancing one blade relative to the other by an angle equal to 360° divided by twice the number of vanes in a blade.

12. A method as set forth in claim 9 further comprising the steps of: moving the viscous material in a selected flow direction, and arranging the blades such that the vanes thereof engage the viscous material with working surfaces pumping the material down and in opposition to the flow of the viscous material between the stirrers.

13. A method as set forth in claim 9 further comprising the steps of: moving the viscous material in a selected flow direction; and arranging the blades in an uppermost tier, such that the vanes thereof engage the viscous material with working surfaces inclined for pumping upward and aiding the flow of the viscous material near an upper surface of the same between the stirrers.

14. A method as defined in claim 9 wherein the material is made up of elements of the viscous material, and further comprising the step of at least minimally treating each of said elements for homogenizing the same relative to each other.

15. A method is set forth in claim 9 including the steps of inclining the working surfaces of the vanes at an angle of 45° relative to their stirrer axis, and equally spacing the tiers along said stirrer axis.

16. A method of mixing viscous material comprising:
mounting a plurality of stirrers having a plurality of axially spaced tiers of coplanar blades with intermeshing angled vanes for rotation about adjacent parallel axes,
flowing viscous material perpendicular to the plane formed by said parallel axes,
rotating each said stirrer about its axis in an opposing direction to the rotation of an adjacent stirrer of mirror image and providing equal and symmetric treatment to all of the viscous material flowing through said stirrers,
engaging the viscous material with said angled vanes and imparting movement to the viscous material in both an axial direction along said parallel axes and a transverse direction across the flow of said viscous material thus creating tortuous convection patterns for thorough mixing of the viscous material,
and initially intermeshing the angled vanes on blades of adjacent stirrers in one coplanar tier and sequentially intermeshing the angled vanes on blades of said adjacent stirrers in an axially spaced coplanar tier and thereby inhibiting any bypass of the flow of said viscous material through said stirrers so as to provide complete mixing of such material as it flows through said stirrers.

* * * * *

UNITED STATES PATENT AND TRADEMARK OFFICE
CERTIFICATE OF CORRECTION

PATENT NO. : 4,493,557

DATED : January 15, 1985

INVENTOR(S) : Ashok L. Nayak and Paul F. Spremulli

It is certified that error appears in the above-identified patent and that said Letters Patent is hereby corrected as shown below:

Column 5, line 7, after "right" add -- and left stirrers 10R and 10L. --

Column 5, line 41, "It" should start a new paragraph.

Column 5, line 54, "Additional" should start a new paragraph.

Column 5, line 58, after "vanes" and before "is" insert -- 34 --.

Column 5, line 60, "It" should start a new paragraph.

Column 5, line 65, "In" should start a new paragraph.

Column 6, line 65, before "plane" and before "P2" insert -- to wipe out their respective histories in the downstream --.

Column 9, line 45, Claim 10, change "adjacnet" to -- adjacent --.

UNITED STATES PATENT AND TRADEMARK OFFICE
CERTIFICATE OF CORRECTION

PATENT NO. : 4,493,557
DATED : January 15, 1985
INVENTOR(S) : Ashok L. Nayak and Paul F. Spremulli It is certified that error appears in the above-identified patent and that said Letters Patent is hereby corrected as shown below:

Column 9, line 45, Claim 10, change "adjacnet" to -- adjacent --.

Signed and Sealed this

Fourteenth Day of May 1985

[SEAL]

Attest:

DONALD J. QUIGG

Attesting Officer

Acting Commissioner of Patents and Trademarks